United States Patent
Fults et al.

(10) Patent No.: US 7,350,513 B2
(45) Date of Patent: Apr. 1, 2008

(54) SYSTEM FOR IMPROVING MOTOR VEHICLE PERFORMANCE

(76) Inventors: Steven P. Fults, 190 N. Griffith St., Manchester, PA (US) 17345; John G. Dexheimer, 513 S. Ogontz St., York, PA (US) 17403

( * ) Notice: Subject to any disclaimer, the term of this patent is extended or adjusted under 35 U.S.C. 154(b) by 0 days.

(21) Appl. No.: 11/521,371

(22) Filed: Sep. 15, 2006

(65) Prior Publication Data
US 2007/0006853 A1   Jan. 11, 2007

Related U.S. Application Data

(62) Division of application No. 11/399,654, filed on Apr. 7, 2006, now abandoned, which is a division of application No. 10/747,209, filed on Dec. 30, 2003, now Pat. No. 7,107,765.

(60) Provisional application No. 60/469,011, filed on May 9, 2003.

(51) Int. Cl.
*F02B 35/00* (2006.01)
(52) U.S. Cl. .................................................. 123/542
(58) Field of Classification Search ......... 123/540–542
See application file for complete search history.

(56) References Cited

U.S. PATENT DOCUMENTS

| | | |
|---|---|---|
| 1,244,442 A | 10/1917 | Frazer |
| 1,280,569 A | 10/1918 | Smith |
| 1,365,661 A | 1/1921 | Coulombe |
| 1,560,947 A | 11/1925 | Skelton |
| 1,828,085 A | 10/1931 | Syrovy et al. |
| 2,172,522 A | 9/1939 | Sline |
| 2,211,795 A | 8/1940 | Sauer |
| 2,233,327 A | 2/1941 | Sauer |
| 2,603,944 A | 7/1952 | Rappl |
| 3,045,421 A | 7/1962 | Pagliuca |
| 3,269,110 A | 8/1966 | Caddell |
| 3,561,210 A | 2/1971 | Wiseman, Jr. |
| 3,712,065 A | 1/1973 | Hurst |
| 3,927,656 A | 12/1975 | Reed et al. |
| 3,940,097 A | 2/1976 | Wilson et al. |
| 4,012,907 A | 3/1977 | Crayton |
| 4,048,798 A | 9/1977 | Larkins, Jr. |
| 4,058,096 A * | 11/1977 | Brown ....................... 123/542 |

(Continued)

*Primary Examiner*—M. McMahon
(74) *Attorney, Agent, or Firm*—Welsh & Flaxman LLC

(57) ABSTRACT

A system for improving motor vehicle performance includes an air intake heat exchanger placed in-line with the air intake of the motor vehicle. The air intake heat exchanger is coupled to a source of pressurized media for selective application of the pressurized media to the air intake heat exchanger for cooling and drying intake air prior to reaching the intake manifold and ultimately the combustion chamber. The system further includes a flow inducing member positioned within the exhaust pipe of a motor vehicle. The flow inducing member is coupled to the source of pressurized media for selective application of the pressurized media in a manner which creates an increased flow within the exhaust system thereby increasing the flow through the air intake and intake manifold. A system for exhausting $CO_2$ to an adjacent vehicle is also disclosed. The system includes an outlet for dispensing $CO_2$ along the side of the motor vehicle such that the $CO_2$ may enter the intake of motor vehicles adjacent the dispensing system to thereby reduce the performance of the motor vehicles coming into contact with the $CO_2$.

4 Claims, 5 Drawing Sheets

U.S. PATENT DOCUMENTS

| | | |
|---|---|---|
| 4,155,337 A | 5/1979 | Hensley |
| 4,201,178 A | 5/1980 | Tyrer et al. |
| 4,301,718 A | 11/1981 | Lindberg |
| 4,313,523 A | 2/1982 | Copen |
| 4,339,918 A | 7/1982 | Michikawa |
| 4,418,532 A | 12/1983 | Momose et al. |
| 4,683,725 A | 8/1987 | Sugiura |
| 4,864,825 A | 9/1989 | Kakuta |
| 4,912,927 A | 4/1990 | Billington |
| 5,282,361 A | 2/1994 | Sung |
| 5,558,069 A * | 9/1996 | Stay ............................ 123/541 |
| 5,871,001 A | 2/1999 | Pelkey |
| 5,941,069 A | 8/1999 | Heath |
| 6,024,074 A * | 2/2000 | Koethe ........................ 123/541 |
| 6,192,838 B1 | 2/2001 | Matsuo et al. |
| 6,308,740 B1 | 10/2001 | Smith et al. |
| 6,311,678 B1 | 11/2001 | Lepoutre |
| 6,343,594 B1 | 2/2002 | Koeslin et al. |
| 6,360,730 B1 * | 3/2002 | Koethe ........................ 123/541 |
| 6,394,076 B1 | 5/2002 | Hudelson |
| 6,675,781 B1 * | 1/2004 | Markley ...................... 123/542 |
| 7,107,765 B2 * | 9/2006 | Fults et al. ..................... 60/316 |
| 2002/0011242 A1 | 1/2002 | Ruppel et al. |
| 2004/0221829 A1 * | 11/2004 | Fults et al. ............. 123/184.38 |

\* cited by examiner

SYSTEM FOR IMPROVING MOTOR VEHICLE PERFORMANCE

CROSS REFERENCE TO RELATED APPLICATIONS

This application is a divisional of U.S. patent application Ser. No. 11/399,654, filed Apr. 7, 2006, now abandoned entitled "SYSTEM FOR IMPROVING MOTOR VEHICLE PERFORMANCE", which is a divisional of U.S. patent application Ser. No. 10/747,209, filed Dec. 30, 2003, now U.S. Pat. No. 7,107,765 entitled "SYSTEM FOR IMPROVING MOTOR VEHICLE PERFORMANCE", which is based upon U.S. Provisional Application Ser. No. 60/469,011, filed May 9, 2003, entitled "SYSTEM FOR IMPROVING MOTOR VEHICLE PERFORMANCE".

BACKGROUND OF THE INVENTION

1. Field of the Invention

The invention relates to a system for improving motor vehicle performance. More particularly, the invention relates to a motor vehicle system utilizing compressed liquefied gas for cooling, drying, increasing flow of intake air, increasing flow of exhaust gases, and ultimately enhancing performance. In addition, the present invention relates to a system for potentially reducing performance of other close proximity vehicles.

2. Description of the Prior Art

Individuals within the automotive industry are continually looking for ways in which to improve the performance of combustion engines. Over time, it has been learned that cool dry air optimizes combustion of fuel within the combustion chamber of an automobile. In addition, the ability for one to provide increased gaseous flow to and from the combustion chamber also affects the performance of the motor vehicle.

Superchargers and turbochargers have been incorporated within motor vehicles in an effort to optimize vehicle performance. However, these systems are expensive to incorporate and include performance lag times due to their inability to provide for an immediate increase in gaseous flow.

In addition, recent motor vehicles have utilized nitrous oxide in an effort to cool and dry intake air entering combustion chambers. However, the implementation of these systems is very expensive and the nitrous oxide is difficult to utilize.

With this in mind, a need continues to exist for a system whereby motor vehicle performance is improved in a convenient and cost effective manner. The present invention provides such a system.

SUMMARY OF THE INVENTION

It is, therefore, an object of the present invention to provide a system for improving motor vehicle performance, wherein the motor vehicle includes an air intake, an intake manifold, a combustion chamber and an exhaust system including an exhaust pipe. The system includes an air intake heat exchanger placed in-line with the air intake of the motor vehicle. The air intake heat exchanger is coupled to a source of pressurized media for selective application of the pressurized media to the air intake heat exchanger for cooling and drying intake air prior to reaching the intake manifold and ultimately the combustion chamber. The system further includes a flow inducing member positioned within the exhaust pipe of a motor vehicle. The flow inducing member is coupled to the source of pressurized media for selective application of the pressurized media in a manner which creates an increased flow within the exhaust system thereby increasing the flow through the air intake and intake manifold.

It is also an object of the present invention to provide a system for improving motor vehicle performance, wherein the motor vehicle includes an air intake, an intake manifold, a combustion chamber and an exhaust system including an exhaust pipe. The system includes a flow inducing member positioned within the exhaust pipe of a motor vehicle. The flow inducing member is coupled to a source of pressurized media for selective application of the pressurized media to the flow inducing member in a manner which creates increased flow within the exhaust system, increasing the flow of air at the air intake and intake manifold.

It is another object of the present invention to provide a motor vehicle system for exhausting $CO_2$ toward an adjacent vehicle. The system includes a supply of pressurized $CO_2$ mounted within the vehicle and linked to a dispensing system for selective dispensing of the $CO_2$. The dispensing system includes an outlet for dispensing $CO_2$ along the side of the motor vehicle such that the $CO_2$ may enter the intake of motor vehicles adjacent to the dispensing system to thereby reduce the performance of the motor vehicles coming into contact with the $CO_2$.

It is a further object of the present invention to provide a system for improving motor vehicle performance, wherein the motor vehicle includes an air intake, an intake manifold, a combustion chamber and an exhaust system including an exhaust pipe. The system includes an air intake heat exchanger placed in-line with the air intake of the motor vehicle. The air intake heat exchanger is coupled to a source of pressurized $CO_2$ for selective application of the $CO_2$ to the air intake heat exchanger for cooling and drying intake air prior to reaching the intake manifold and ultimately the combustion chamber.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
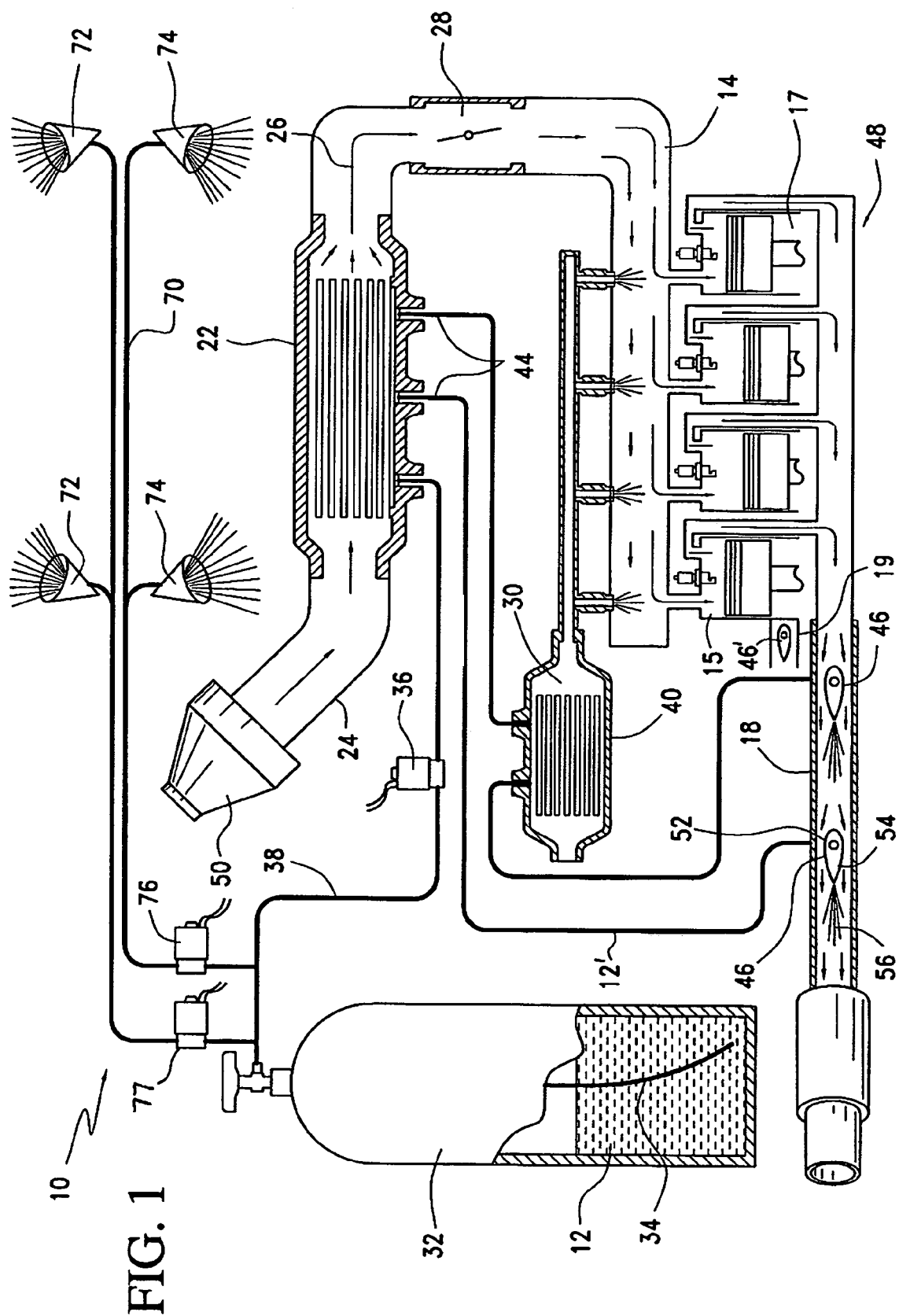
FIG. 1 is a schematic of the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to the various figures, a system 10 for improving motor vehicle performance is disclosed. That is, the present system 10 improves the power output of a motor vehicle. In general, the present system 10 utilizes compressed liquefied gas 12, for example, pressurized $CO_2$, to cool and dry intake air prior to reaching the intake manifold 14, and ultimately the combustion chamber 15. The system 10 further increases gaseous flow through the system 10 through the application of high velocity gas within the exhaust pipe 18 of a motor vehicle 20. In accordance with a preferred embodiment of the present invention, both the compressed liquefied gas utilized in cooling and drying air prior to reaching the intake manifold and the high velocity gas utilized within the exhaust pipe are pressurized $CO_2$, although those skilled in the art may appreciate other pressurized media which might be used without departing form the spirit of the present invention. The term pressurized media is used herein in describing a variety of gases, liquids and solids maintained under pressure for utilization in accordance with the spirit of the present invention.

More particularly, an air intake heat exchanger 22 is placed in-line with the air intake 24 of a motor vehicle 20. In accordance with a preferred embodiment of the present invention, the air intake heat exchanger 22 is a tube-in-shell heat exchanger. The air intake heat exchanger 22 employs a supply of compressed liquefied gas 12 to cool intake air 26 passing through the heat exchanger 22. In addition to cooling the air 26 passing through the heat exchanger 22, the intake air 26 is also dehumidified.

Once cooled, the intake air 26 is passed through the throttle body 28, into the intake manifold 14 and within the combustion chamber 15 where it combusts with the fuel 30 to power a motor vehicle 20. By cooling and drying the intake air 26 in this manner, the performance of the motor vehicle 20 is enhanced. In particular, it is generally understood by those skilled in the art that dry and cold air enhances vehicle performance by providing for improved combustion with the motor vehicle fuel.

The compressed liquefied gas 12 supplied to the heat exchanger 22 is preferably in the form of pressurized liquid $CO_2$ as a greater pressure drop may be achieved to thereby produce a greater cooling effect upon the air 26 passing through the air intake heat exchanger 22. With this in mind, the $CO_2$ canister 32 utilizes a dip tube 34 such that liquid $CO_2$ 12 is drawn from the $CO_2$ canister 32. Activation of the $CO_2$ applied to the air intake heat exchanger 22 is achieved by positioning a solenoid valve 36 along the line 38 leading to the air intake heat exchanger 22. Although liquid $CO_2$ is utilized in accordance with a preferred embodiment of the present invention, other fluid formats (e.g., liquid or gas) may be employed without departing from the spirit of the present invention.

In addition to dry and cold air improving motor vehicle performance, it is generally regarded that colder fuel will enhance motor vehicle performance. As such, the $CO_2$ 12 may also be utilized in cooling a fuel heat exchanger 40 specifically designed for cooling motor vehicle fuel 30. As with the air intake heat exchanger 22, the fuel heat exchanger 40 is cooled through the application of compressed liquefied gas 12, preferable pressurized liquid $CO_2$. In accordance with a preferred embodiment of the present invention, the $CO_2$ 12 is supplied from the outlet 44 of the air intake heat exchanger 22. However, and as those skilled in the art will certainly appreciate, the $CO_2$ may be directly supplied to the fuel heat exchanger 40. Ultimately, the cooled fuel 30 is combined with the cooled intake air 26 in the intake manifold 14, cylinder head (not shown) or combustion chamber 15.

Enhanced flow through the present system 10 is achieved by the inclusion of flow inducing members 46 within the exhaust pipe 18 of a motor vehicle 20. The inclusion of the flow inducing members 46 in accordance with the present invention creates a higher velocity within the exhaust system 48, which enhances the intake of air 26 at the air intake filter 50 and air intake tube 24. More particularly, each flow inducing member 46 is positioned with its wide end 52 facing upstream and its pointed end 54 facing downstream. As such, and in accordance with aerodynamics, a lower velocity is created adjacent the pointed end 54 of the flow inducing member 46 as exhaust gases pass over the flow inducing member 46. However, and in accordance with a preferred embodiment of the present invention, the flow inducing members 46 are formed such that pressurized gas 56, for example, $CO_2$ 12, is selectively expelled from the pointed end 54 of the flow inducing member 46. Expelling pressurized gas 56 from the flow inducing member 46 in this way enhances the flow through the exhaust system 48 and, ultimately, through the intake of a motor vehicle 20.

Figure 2:
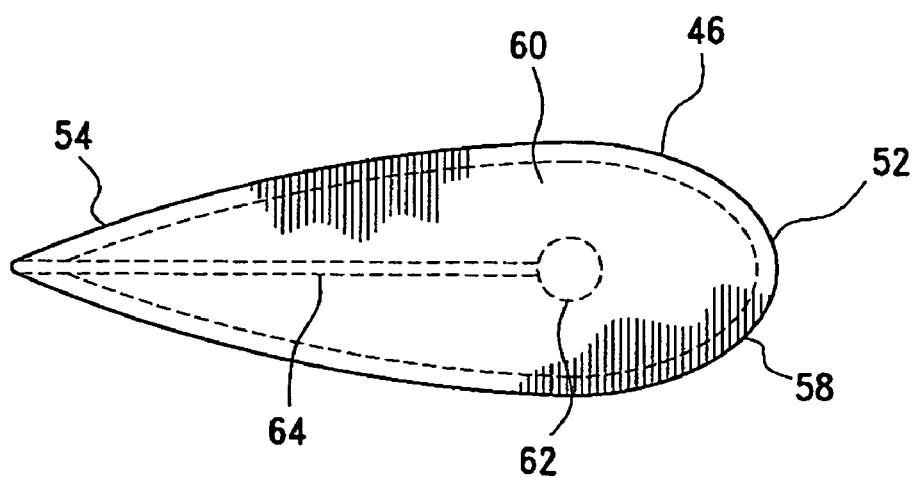
FIG. 2 is a side view of a flow inducing member in accordance with the present invention.
Figure 3:
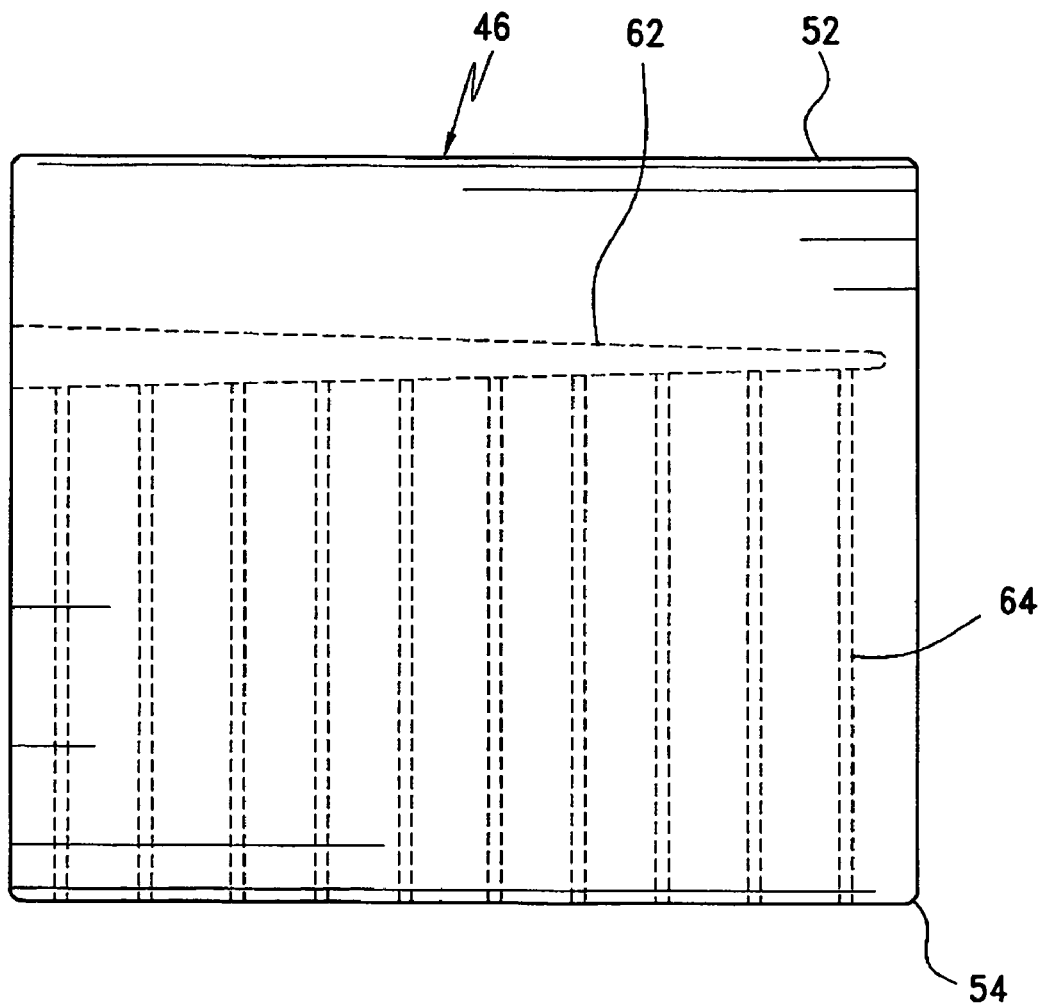
FIG. 3 is a top view of the flow inducing member shown in FIG. 2.
Figure 4:
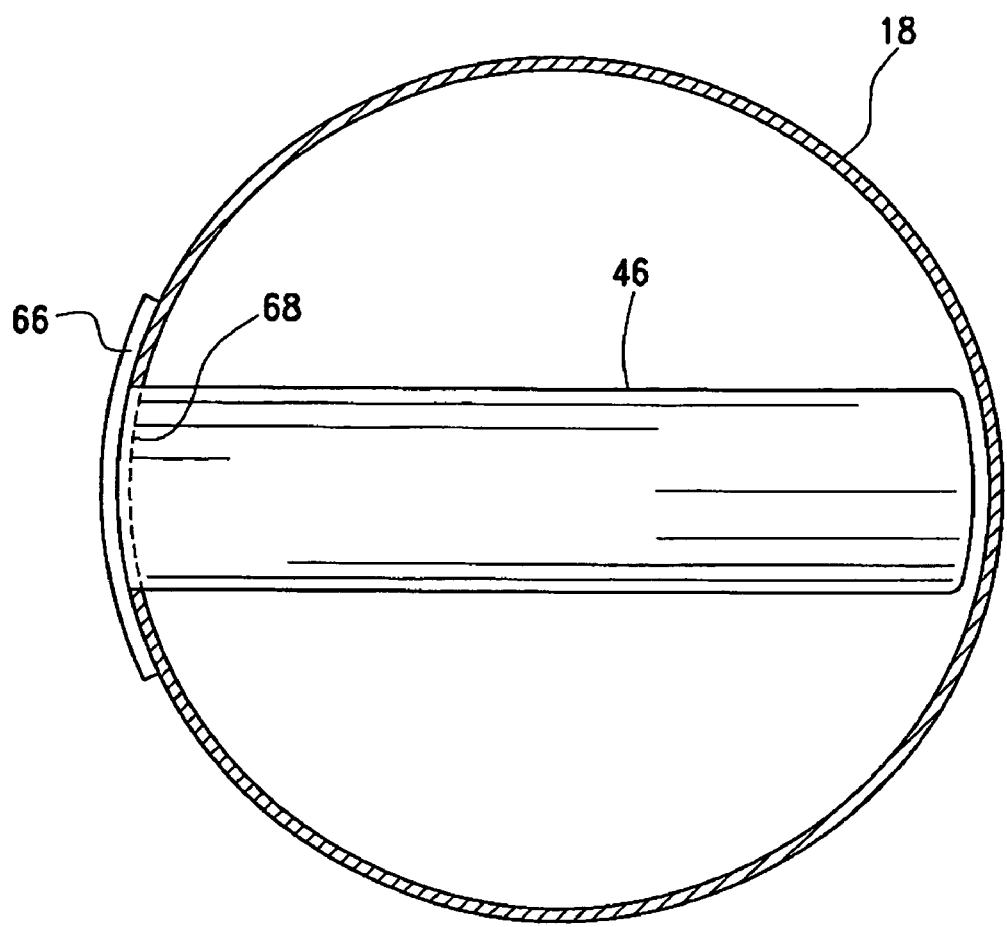
FIG. 4 is a cross-sectional view of the exhaust pipe with the flow inducing member shown in FIG. 2.
Figure 6:
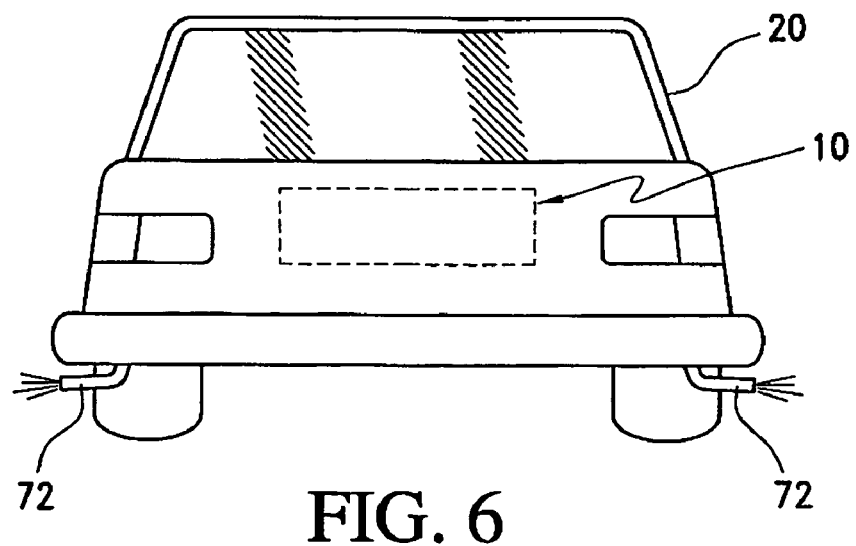
FIG. 6 is a front view of a motor vehicle in accordance with the present invention.
Figure 5:
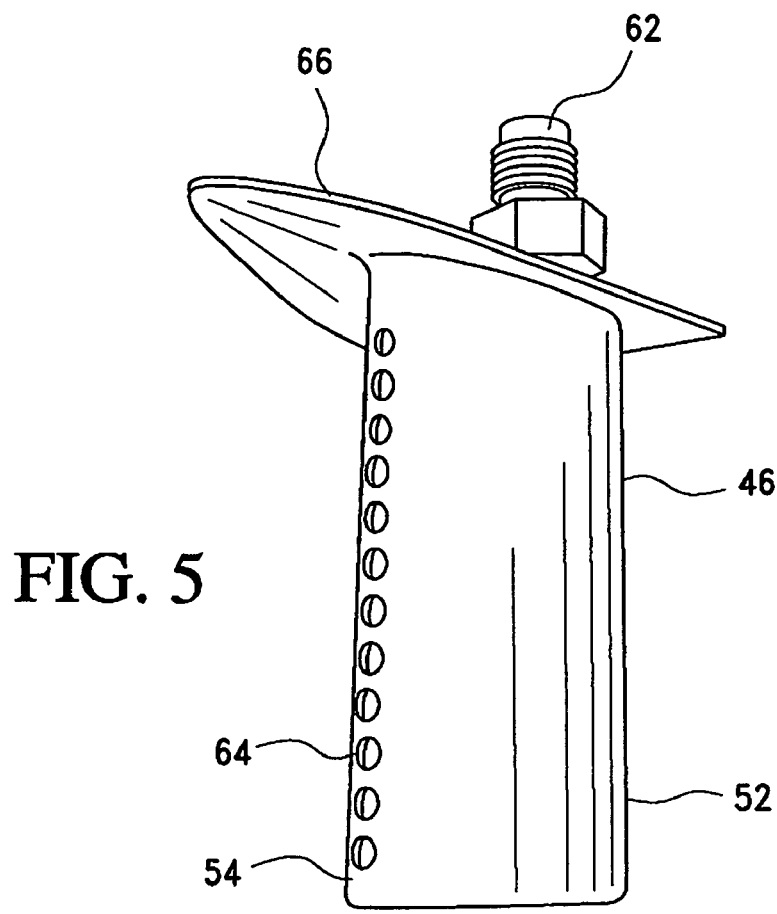
FIG. 5 is a perspective view of the flow inducing member shown in FIG. 2.

With reference to FIGS. 2, 3 and 5, each of the flow inducing members 46 is shaped and dimensioned to extend substantially along the entire diameter of the exhaust pipe 18 into which they are positioned. In fact, the free end of the flow inducing member 46 may be formed with a slightly rounded edge conforming to the inner shape of the exhaust pipe 18 into which it is positioned. In addition, and as those skilled in the art will certainly appreciate, the number of flow inducing members 46 positioned within an exhaust pipe 18 may be varied to suit specific needs and specific applications.

The wing shaped members 46 are preferably constructed of an outer shell 58 (for example, composed of CroMoly steel) and an inner filling material 60 (for example, aluminum). In particular, the outer shell 58 is preferably extruded streamline tubing readily available from a wide variety of sources. The extruded tubing is cut to size and filled with aluminum. Once the aluminum hardens a tapered inlet tube 62 is drilled along the transverse extent of the flow inducing member 46. Jet ports 64, perpendicular to the transverse inlet tube 62, are then drilled from the pointed end 54 of the flow inducing member 46 into fluid communication with the inlet tube 62. As such, pressurized gas flowing into the inlet tube 62 is forced out of the pointed end 54 of the flow inducing member 46 for enhancing the flow throughout the system 10. An even flow of pressurized gas across the jets ports of the flow inducing member is achieved by tapering the inlet tube 62 as it extends from the open end of the inlet tube 62 toward the closed end of the inlet tube 62.

The flow inducing member 46 is mounted with the exhaust pipe 18 of a motor vehicle 20 via the inclusion of a mounting flange 66 along an edge of the flow inducing member 46. The mounting flange 66 allows for the insertion of a flow inducing member 46 within a hole 68 formed along the wall of the exhaust pipe 18. Thereafter, the mounting flange 66 is welded to the exhaust pipe 18 for securely mounting the flow inducing member 46 within the exhaust pipe 18.

As disclosed in accordance with a preferred embodiment of the present invention, $CO_2$ is the pressurized gas utilized in creating the desired vacuum within the exhaust pipe 18. The $CO_2$ gas comes from the outlet 44 of the air intake heat exchanger 22. With this in mind, it is preferred that the flow of $CO_2$ through the present system 10 is such that pressurized liquid $CO_2$ 12 is supplied to the air intake heat exchanger 22 where it converts to compressed liquefied gas 12' for subsequent transmission to the flow inducing members 46. In addition to the use of a solenoid valve 36 in selectively activating the flow of $CO_2$ 12, the flow of $CO_2$ 12 is regulated by adjusting the size of the inlet orifice through which the $CO_2$ 12 enters the air intake heat exchanger 22.

As those skilled in the art will certainly appreciate, the flow inducing members may be operated without the heat exchangers to produce enhanced flow through the entire system. When this is desired, it would be advantageous to directly link the flow inducing members to the source of pressurized gas, which may take a variety of forms without departing from the spirit of the present invention.

In addition to the heat exchangers 22, 40 and flow inducing members 46 discussed above, the $CO_2$ 12 may be used in conjunction with a fire suppression system 70 and ground level $CO_2$ dispensing system 72. With regard to the fire suppression system 70, the $CO_2$ 12 is linked to a series of spray heads 74. The spray heads 74 are strategically positioned for dispensing $CO_2$ in the event a fire is detected. When a fire within a motor vehicle engine is sensed, the fire suppression solenoid 76 is actuated permitting the flow of $CO_2$ to the spray heads 74. The $CO_2$ 12 then acts to extinguish the fire.

The ground level $CO_2$ dispensing system 72 is a mechanism for reducing the performance of a racing opponent while racing. In particular, since $CO_2$ is a natural fire suppressant and displaces oxygen from the area adjacent thereto, the ground level $CO_2$ dispensing system 72 acts to replace the oxygen readily available for a racing opponent with $CO_2$. The ground level $CO_2$ dispensing system 72 dispenses $CO_2$ under the control of a solenoid valve 77 along the outside of a motor vehicle 20. The dispensed $CO_2$ will presumably enter the intake of motor vehicles adjacent the dispensing system 72 to thereby reduce the performance of the motor vehicles coming into contact with the $CO_2$. As with the fire suppression system, the ground level $CO_2$ dispensing system is controlled by a solenoid valve 77 selectively actuated by the operator of the motor vehicle.

It is further contemplated that the $CO_2$ powered heat exchangers disclosed in accordance with the present invention may be applied in improving both turbocharger technology and supercharger technology. Where the present technology is applied to turbocharged vehicles, the present system will reduce turbo lag. The present system will also improve throttle response. In addition, and although the present system is primarily designed for using in performance racing vehicles, it is contemplated that the principles of the present system may be applied to general commercial vehicles.

It is further contemplated that the flow inducing technology applied in accordance with the present invention may similarly be applied in evacuating the motor vehicle crankcase 17. Where the present technology is applied in this manner, flow inducing members 46' will be connected to the crankcase 17 of a motor vehicle via an outlet pipe 19 secured to the crankcase 17. The partial vacuum created by the flow inducing members 46' will "reduce windage" within the motor vehicle and ultimately enhance performance.

Figure 7:
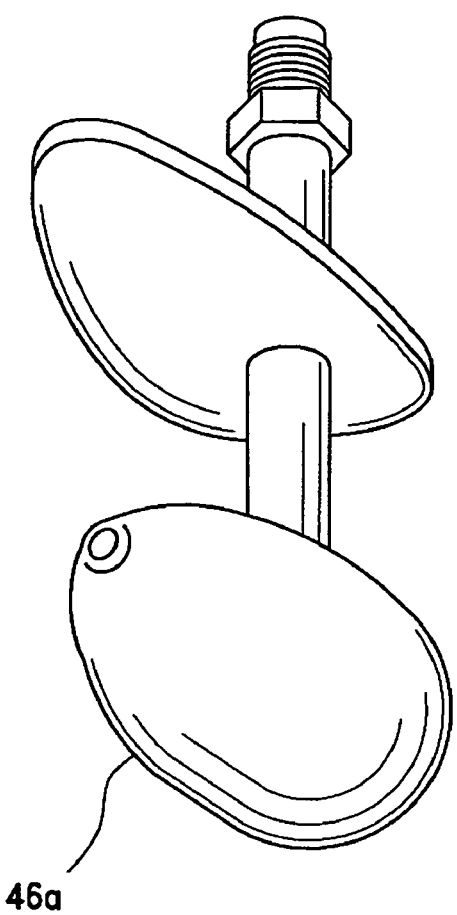
Figure 8:
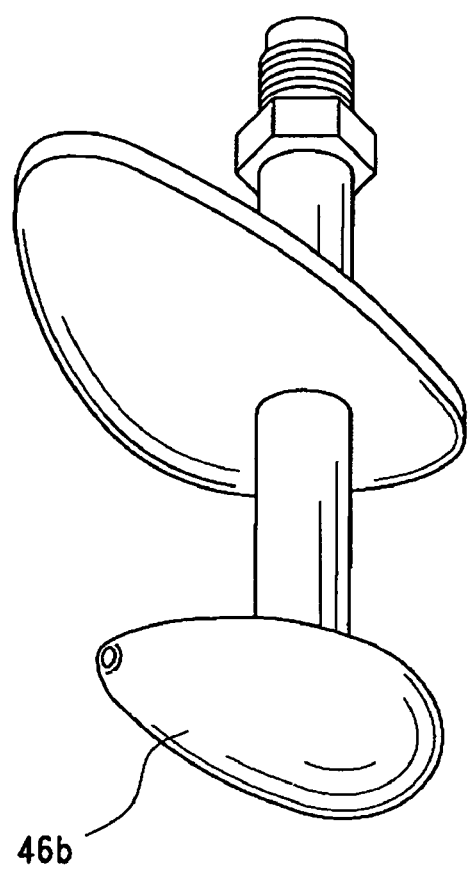
Figure 9:
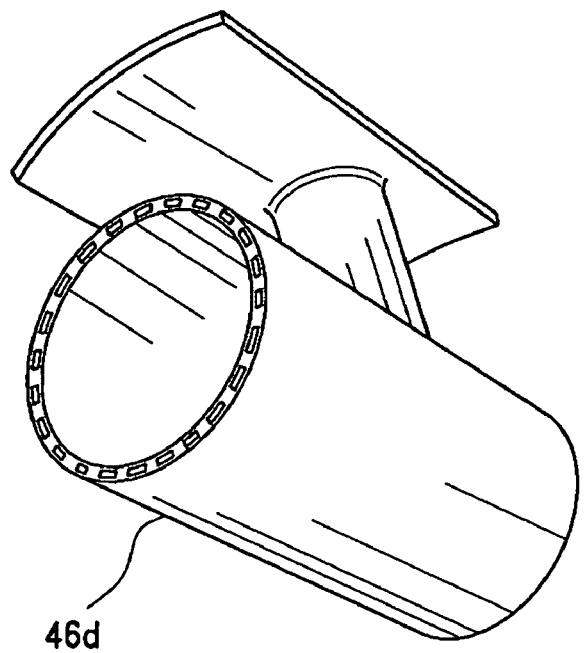

While a wing shaped flow inducing member 46 is disclosed in accordance with the prior embodiment, it is contemplated that various structures may be utilized for the flow inducing member without departing from the spirit of the present invention. Various embodiments contemplated in accordance with the present invention are disclosed in FIGS. 7, 8, 9 and 10. With regard to a pair of embodiments disclosed in FIGS. 7 and 8, the flow inducing member 46a, 46b takes the general shape of a teardrop. The tear drop includes a single pointed end through which pressurized gas is selectively expelled for creating a vacuum and enhancing the flow through the exhaust system 48, ultimately enhancing flow the intake side.

Figure 10:
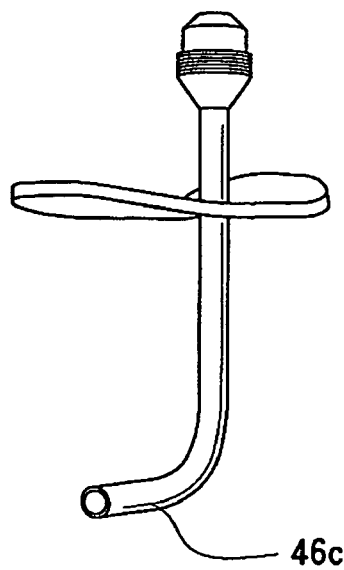
FIGS. 7, 8, 9 and 10 is are perspective views of various flow inducing member designs contemplated in accordance with the present invention.

Another embodiment, as shown in FIG. 10, provides for a simple tubular member for use as the flow inducing member 46c. The tubular member includes an outlet port through which pressurized gas is expelled for creating a vacuum in accordance with the present invention. Finally, and with reference to FIG. 9, an annular flow inducing member 46d is disclosed. The annular flow inducing member 46d sits within the exhaust system 48 creating an annular ring within the exhaust system 48. The annular ring has a profile substantially similar to that of the flow inducing member 46 disclosed in accordance with the embodiment shown in FIGS. 2 to 5. As such, the annular shaped flow inducing member 46d has a substantially wing shaped cross-section and exhaust gas flows both around and within the flow inducing member 46d as pressurized gas is exhausted therefrom.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A system for improving motor vehicle performance, wherein the motor vehicle includes an air intake, an intake manifold, a combustion chamber and an exhaust system including an exhaust pipe, comprising:
    an air intake heat exchanger placed in-line with the air intake of the motor vehicle, the air intake heat exchanger being coupled to a source of pressurized $CO_2$ for selective application of the $CO_2$ to the air intake heat exchanger for cooling and drying intake air prior to reaching the intake manifold and ultimately the combustion chamber.

2. The system according to claim 1, wherein the air intake heat exchanger is a tube-in-shell heat exchanger.

3. The system according to claim 1, wherein pressurized $CO_2$ supplied to the air intake heat exchanger is pressurized liquid $CO_2$ as a greater pressure drop may be achieved to thereby produce a greater cooling effect upon the air passing through the air intake heat exchanger.

4. The system according to claim 1, further including a fuel heat exchanger linked with the motor vehicle fuel supply for cooling fuel prior to combustion, the fuel heat exchanger being coupled to a source of pressurized $CO_2$ for selective application of the $CO_2$ to the fuel heat exchanger.

* * * * *